(12) United States Patent
Sen et al.

(10) Patent No.: US 10,383,055 B2
(45) Date of Patent: Aug. 13, 2019

(54) REGULATING A POWER CONSUMPTION STATE OF A CELLULAR RADIO

(71) Applicant: Hewlett Packard Enterprise Development LP, Houston, TX (US)

(72) Inventors: Souvik Sen, Mountain View, CA (US); Benjamin E. Andow, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,599

(22) PCT Filed: Jan. 26, 2015

(86) PCT No.: PCT/US2015/012908
§ 371 (c)(1),
(2) Date: Jan. 31, 2017

(87) PCT Pub. No.: WO2016/122444
PCT Pub. Date: Aug. 4, 2016

(65) Prior Publication Data
US 2017/0223631 A1     Aug. 3, 2017

(51) Int. Cl.
*H04B 1/38*     (2015.01)
*H04W 52/02*    (2009.01)
(Continued)

(52) U.S. Cl.
CPC ... *H04W 52/0216* (2013.01); *H04W 28/0221* (2013.01); *H04W 52/0258* (2013.01);
(Continued)

(58) Field of Classification Search
CPC ......... E04W 28/0221; H04W 52/0216; H04W 52/0258; H04W 52/0261; H04W 76/048; H04W 76/28; H04W 88/02
See application file for complete search history.

(56) References Cited

U.S. PATENT DOCUMENTS

2004/0153676 A1   8/2004   Krantz et al.
2009/0061954 A1*  3/2009   Syed ................ H04W 52/0225
                                                   455/574
(Continued)

FOREIGN PATENT DOCUMENTS

JP    2006-310909      11/2006
KR    10-0812489 B1    3/2008
(Continued)

OTHER PUBLICATIONS

Deng, S. et al, "Traffic-aware Techniques to REduce 3G/LTE Wireless Energy Consumption", Dec. 10-13, 2012.
(Continued)

*Primary Examiner* — Xin Jia
(74) *Attorney, Agent, or Firm* — Trop, Pruner & Hu, P.C.

(57) ABSTRACT

A technique includes determining a consumption time for content received in a mobile device from a cellular network, where the consumption time represents a time at which the content is received in the mobile device to a time at which content associated with the received content is consumed at an output sink of the mobile device. The technique includes regulating a power consumption state of a cellular radio of the mobile device based at least in part on the consumption time.

15 Claims, 4 Drawing Sheets

(51) Int. Cl.
*H04W 76/28* (2018.01)
*H04W 88/02* (2009.01)
*H04W 28/02* (2009.01)

(52) U.S. Cl.
CPC ....... *H04W 52/0261* (2013.01); *H04W 76/28* (2018.02); *H04W 88/02* (2013.01); *Y02D 70/00* (2018.01); *Y02D 70/1262* (2018.01); *Y02D 70/142* (2018.01); *Y02D 70/144* (2018.01); *Y02D 70/164* (2018.01); *Y02D 70/24* (2018.01)

(56) References Cited

U.S. PATENT DOCUMENTS

| | | | |
|---|---|---|---|
| 2010/0077083 | A1 | 3/2010 | Tran et al. |
| 2012/0120843 | A1 | 5/2012 | Anderson et al. |
| 2012/0122495 | A1 | 5/2012 | Weng et al. |
| 2012/0167118 | A1* | 6/2012 | Pingili .................. G06F 1/3206 719/318 |
| 2013/0027289 | A1* | 1/2013 | Choi ........................ G06F 3/14 345/156 |
| 2013/0222210 | A1 | 8/2013 | Wang et al. |
| 2014/0064165 | A1 | 3/2014 | Chung et al. |
| 2016/0034245 | A1* | 2/2016 | Karunakaran ........ G06F 3/1454 345/2.2 |

FOREIGN PATENT DOCUMENTS

| | | |
|---|---|---|
| KR | 10-2012-0117015 | 10/2012 |
| WO | WO-2014120173 | 8/2014 |
| WO | WO-2014182388 A1 | 11/2014 |

OTHER PUBLICATIONS

Yeh et al., "Comparative Analysis of Energy-Saving Techniques in 3GPP and 3GPP2 Systems," IEEE Transactions on Vehicular Technology (TVT) 58, 1 (2009).

Pyles et al., "SAPSM: Smart Adaptive 802.11 PSM for Smartphones," Proceedings of the 2012 ACM Conference on Ubiquitous Computing, ACM, 2012, pp. 11-20.

Puustinen et al., "The effect of unwanted Internet traffic on cellular phone energy consumption," In Proceedings of the 4th IFIP International Conference on New Technologies, Mobility and Security (NTMS) (Paris, France, Feb. 2011), 5 pages.

Liers et al., "UMTS data capacity improvements employing dynamic RRC timeouts," In Proceedings of the 16th IEEE: International Symposium on Personal, Indoor and Mobile Radio Communications (PIMRC) (Berlin, Germany, Sep. 2005), 13 pages.

International Search Report and Written Opinion received for PCT Patent Application No. PCT/US2015/012908, dated on Jul. 9, 2015, 7 pages.

International Preliminary Report on Patentability received for PCT Patent Application No. PCT/US2015/012908, dated on Aug. 10, 2017, 6 pages.

Huang et al., "Screen-Off Traffic Characterization and Optimization in 3G/4G Networks," Proceedings of the 2012 ACM conference on Internet measurement conference, 2012, pp. 357-364.

European Search Report and Search Opinion Received for EP Application No. 15880348.6, dated Apr. 17, 2018, 12 pages.

Enck et al. "TaintDroid: An Information-Flow Tracking System for Realtime Privacy Monitoring on Smartphones," Communications of the ACM 2010, pp. 393-407.

* cited by examiner

REGULATING A POWER CONSUMPTION STATE OF A CELLULAR RADIO

BACKGROUND

A typical mobile device, such as a smartphone, may contain one or multiple radios (cellular radio, WiFi radio, Bluetooth radio, and so forth) for purposes of transmitting and receiving electromagnetic signals to wirelessly communicate data over respective network(s). The battery life of the mobile device (i.e., the time, which the mobile device may operate on a full charge) typically is a function of how the device used. In this manner, the battery life typically is a function of factors that affect how rapidly the battery's stored energy is consumed, such as radio operations, processor utilization and display usage.

DETAILED DESCRIPTION

Figure 1:
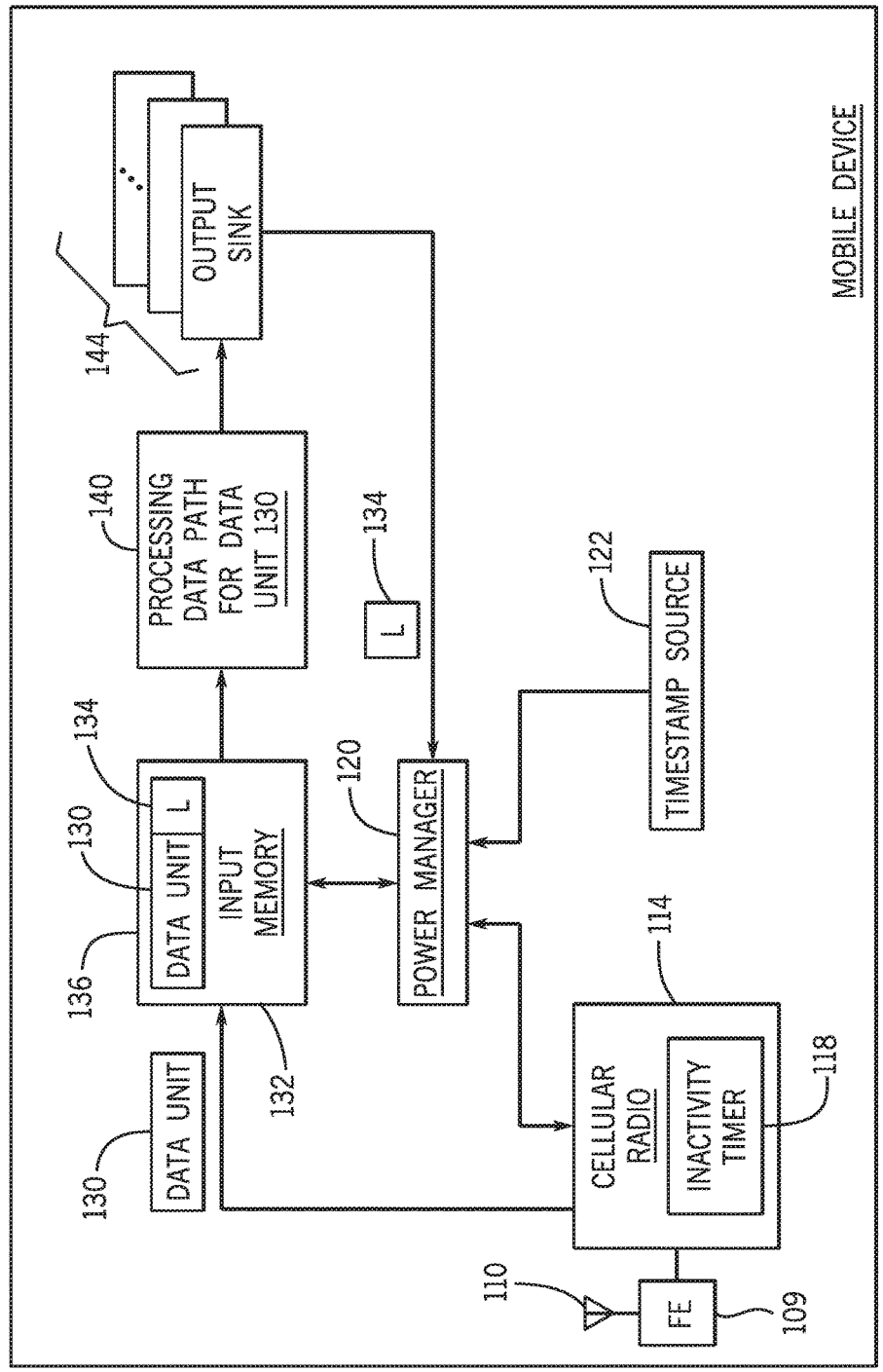
FIG. 1 is a schematic diagram of a mobile device according to an example implementation.

Cellular radio operation may contribute significantly to the overall energy consumption of a mobile device and as such, may play a significant role in determining the device's battery life. In accordance with example systems and techniques that are disclosed herein, the reception mode of a mobile device's cellular radio is regulated for purposes of controlling the power that is demanded by the radio. In this context, the mobile device is an electronic device, which has a cellular radio, such as a cellular telephone; a cellular telephone, often called a "smartphone," which has computer capabilities (the ability to access the Internet, run applications, and so forth); a notebook or portable computer with a cellular interface; a tablet with a cellular interface; a WiFi hotspot; and so forth.

One way to regulate the power consumption of the mobile device's cellular radio is to regulate when the radio has an active reception mode for purposes of receiving data from the cellular network and correspondingly, regulate when the cellular radio has an inactive reception mode and thus, is not able to receive data from the cellular network. In this manner, due to the relatively lower power consumption of the cellular radio when its reception mode is inactive, it may be advantageous from a power conservation perspective to maximize the time that the cellular radio cannot receive data. However, disabling the reception mode at inappropriate times, may adversely affect the performance of the mobile device, as data is not being received from the network.

Example systems and techniques are disclosed herein, which are sensitive to the specific latency of the content that is being received from the cellular network for purposes of balancing power conservation with performance. In particular, in accordance with example implementations, the rate at which content flows through a mobile device is an indicator of the latency sensitivity of the content; and the power consumption state of a cellular radio of the mobile device is regulated based at least in part on an observation of the flow.

More specifically, in accordance with systems and techniques that are disclosed herein, a power consumption state of a cellular radio is regulated based at least in part on the observed time for data content received from a cellular network to propagate through the mobile device from the device's network input (where the data is received) to an output sink (a speaker, a display, a vibrating device, a non-cellular network, and so forth) of the device, where the data is consumed. In other words, in accordance with example systems and techniques that are disclosed herein, the power state of the cellular radio is regulated based on an observed data "consumption time," which refers to the time for the mobile device to consume the data after receiving the data from the cellular network.

The mobile device, in accordance with example implementations, affixes timestamp tags, or labels, to "data units," as the data units are received from the cellular network; observes the timestamp information from the labels as the data units or derivatives thereof are consumed at output sink(s) of the mobile device; calculates corresponding consumption time(s); and regulates the power consumption state of the radio based at least in part on the determined consumption time(s).

In accordance with example implementations, a "data unit" is a package of data and may be, as examples, a byte or multiple bytes of data. As examples, in some implementations, the data unit may have a size commensurate with the size of payload data received in a network packet; may a size that corresponds to multiple packet payloads; or may have a size that is smaller than the size of network packet payload data. Moreover, the grouping of data for a data unit and the corresponding size of the data unit may vary according to data type. For example, the size (in bytes) of a data unit for audio data (ultimately played at the mobile device's speaker, for example) may be relatively small, as compared to, for example, the size of a data unit for video data, which may represent the data for an entire video frame. In yet further example implementations, the data unit may be a collection of several bits less than a byte. Thus, data may be grouped together in various ways, and the data unit may have a wide variety of sizes, as many implementations are contemplated, which are within the scope of the appended claims.

As a more specific example, in accordance with example implementations, the consumption time is a continuous time interval that is measured from a time when particular data content (content associated with one or multiple data units) arrives at the mobile device from the cellular network to a time at which the data content, or a derivative of the data content, reaches the user of the mobile device by being consumed at an output sink of the mobile device. The output sink may be, as examples, a display (visual), speaker(s) (sound) vibration motor (touch) or other user stimulus producing component of the mobile device. In accordance with some implementations, the output sink may be a non-cellular network interface that forwards data to another device. As an example, the "other device" may be a portable computer that is attached via a tethered connection (a wireless connection (WiFi, for example) or a wired connection (a Universal Serial Bus (USB) connection, for example)) to the mobile device. In this manner, the tethered end device may, for example, play audio or visual content that is communicated from the mobile device to the tethered end device over a non-cellular network interface.

It is noted that the data, or content, which is consumed at the output sink may differ in some aspects from the data, or content that is received from the cellular network. For example, the content received from the network may be reformatted, resampled, filtered or otherwise processed by the mobile device to form the content that is consumed at the output sink. Thus, in general, the mobile device determines the consumption time based on a difference between a time that the content is received from the cellular network and a time that content associated with the received content is consumed at an output sink of the mobile device.

The consumption time may vary as a function of data type. For example, if the data content is audio content that is received from a music streaming service, the audio content may be streamed by the service as the mobile device is playing the music. The amount of time that the mobile device spends downloading data for a given song may be less than the amount of time that is consumed playing the song. If the cellular radio is active, the mobile device may prefetch the data for the song for purposes of ensuring smooth playback of the audio.

If a relatively large enough time passes between the time when the audio content is received from the cellular network and time when the audio is played over the mobile device's speaker(s), the processing of the audio content may be relatively insensitive to latencies in receiving the audio content from the cellular network, as compared to other content that the mobile device may receive from the cellular network. For example, as a contrast, the mobile device may receive streaming video content and consume the video content at a relatively faster rate than audio content. Moreover, the video decoder of the mobile device may present the content to the user more rapidly for higher bit rates. Thus, for audio content, the cellular radio may be inactive for relatively longer periods without adversely impacting audio playback performance, as compared to the inactivity periods for video playback.

Referring to FIG. 1, as a more specific example, in accordance with some implementations, a mobile device 100 includes a power manager 120, which regulates a power consumption of a cellular radio 114 based at least in part on the time for an incoming data unit 130 to propagate through the mobile device 100 from the mobile device's input to an output sink 144 of the mobile device 100. In this manner, output sink 144 may be a display, a speaker, a vibrating motor, or a non-cellular network interface (a Wi-Fi interface, a USB interface, and so forth), which tethers the mobile device 100 to another device (a portable computer, desktop computer, and so forth). As examples, the mobile device 100 may be a portable computer, a cellular telephone, a tablet, a smartphone, or a desktop computer, which accesses a cellular network using its cellular radio 114. When the cellular radio 114 is active for purposes of receiving data content from the cellular network, the cellular radio 114 may transmit and receive electromagnetic waves to and from the cellular network (via a front end interface 109 and its antenna 110).

FIG. 1 generally illustrates the flow of an example data unit 130 (received from the cellular network) through the mobile device 100. The mobile device 100, after receiving the data unit 130 from the cellular network, stores the data unit 130 in an input memory 132 of the mobile device 100. The input memory 132 represents a buffer, or region, of memory, of the mobile device 100 for purposes of receiving data content from the cellular network. The input memory 132 may be a dedicated memory; may be part of a memory shared for other purposes; may be formed from contiguous memory spaces; may be formed from non-contiguous memory spaces; or may be formed from contiguous and non-contiguous memory spaces. The size of the input memory 132 may vary, according to data type. For example, an input memory for audio content may be allocated a relatively smaller size than an input memory for video content. The size of the input memory may dynamically vary over time for the same data type. For example, the input memory size may vary with the bit rate at which the data content is received from the cellular network. Moreover, the input memory size may be controlled by an application or driver, which allocates the memory.

As depicted in FIG. 1, the power manager 120 labels the data unit 130 by effectively affixing a label 134 to the data unit 130 to provide an associated labeled data unit 136. In accordance with example implementations, the label 134 is a timestamp, which represents a time at or near the time that the associated data unit 130 is received from the cellular network. For this purpose, the power manager 120 may receive an indication, or representation, of a current time from a timestamp source 122 (a real time clock (RTC) module, as an example), and the label 134 may indicate, or represent, the received current time. The labeled data unit 136 propagates from the input memory 132 through a processing path 140 of the mobile device 100; the data associated with the data unit 136 is ultimately consumed by an output sink 144.

When the data associated with labeled data unit 136 is consumed by an output sink 144, the power manager 120 receives an indication of the associated label 134, and using the corresponding timestamp indicated by the label 134, the power manager 120 determines a corresponding consumption time. In this regard, in accordance with example implementations, the power manager 120 may determine the consumption time based on a difference between the time represented by the label 134 and a current time (representing the time at which the output sink 144 consumes the data associated with the data unit 130), which is indicated by the timestamp source 122. Based on the determined consumption time, the power manager 120 regulates an inactivity timer 118 of the cellular radio 114, i.e., in general, regulates a level of overall activity/inactivity level for the radio 114, for purposes of regulating the cellular radio's power consumption state.

In accordance with example implementations, regardless of any transformation of the data unit 130 that occurs in the processing path 140, the label 134 remain attached or affixed to the transformed data associated with the data unit 130 so that this associated data may be identified for purposes of tracking the time that the data is consumed.

The consumption time for a given data unit may be subject to a latency that falls within a potentially wide range of latencies, in accordance with example implementations. In this manner, factors that affect the consumption time, such as the size of the input memory 132, the latency of the processing path 140, and so forth, may vary according to a number of factors, such as (as examples) the number of applications executing on the mobile device 100, type data type of the content, the number of other data streams that are being processed by the mobile device, the number of other concurrently occurring operations of the mobile device 100 (a phone call, for example), the rate at which the data is consumed at the output sink 144, and so forth. A particular advantage of the data flow management systems and techniques that are disclosed herein is that, in accordance with example implementations, the cellular radio's power consumption state may be regulated without knowledge of the specific factors that affect the consumption time.

Figure 2:
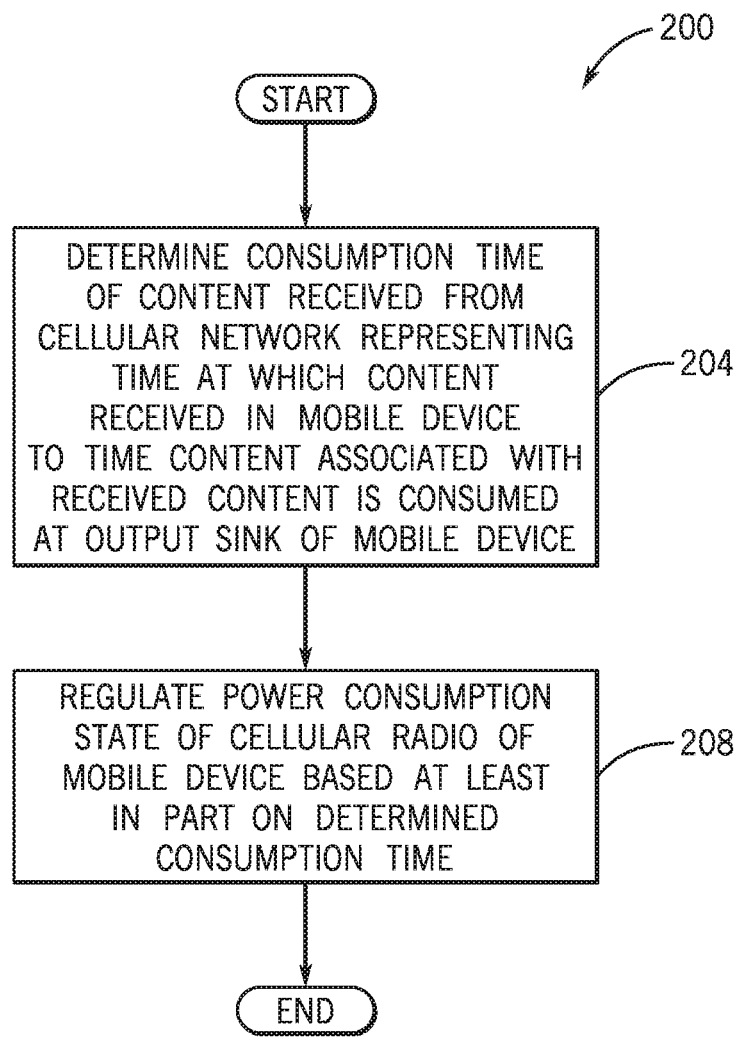
FIG. 2 is a flow diagram depicting a technique to regulate a power consumption state of a cellular radio of a mobile device according to an example implementation.

Thus, referring to FIG. 2 in conjunction with FIG. 1, in accordance with example implementations, a technique 200 includes determining (block 204) a consumption time of content received from a cellular network representing a time at which content is received in a mobile device to a time that content associated with the received content is consumed at an output sink of the mobile device. A power consumption state of a cellular radio of the mobile device is regulated based at least in part on the determined consumption time, pursuant to block 208.

The power manager 120 may perform measurements to observe the data flow through the mobile device 100 in many different ways, depending on the particular implementation. For example, in accordance with example implementations, the power manager 120 may determine a consumption time for each data unit received from the cellular network and adjust the power consumption state of the radio 114 on an ongoing basis as the consumption times are determined. In accordance with further example implementations, the power manager 120 may not determine the consumption time for each data unit that is received from the cellular network, but instead, the power manger 120 may determine a consumption time at certain time intervals (periodic time intervals, for example) by correspondingly sampling the data unit flow and adjusting the power consumption state of the radio 114 accordingly. In accordance with some example implementations, the power manager 120 may determine a rolling, or windowed average, of the consumption time for each data unit or each sampled data unit and adjust the power consumption state of the radio 114 accordingly. As another example, in accordance with some implementations, the power manager 120 may determine a consumption time for a given data type (audio data or video data, as examples) associated with a data stream that is currently being received from the cellular network, regulate the power consumption state of the cellular radio 114 based on the determined consumption time; and then cease further adjustment to the radio's power consumption state until the stream ends (the user closes the music player application on the mobile device 100, for example) and/or another stream begins. Thus, many variations are contemplated, which are within the scope of the appended claims.

In accordance with example implementations, the power manager 120 may program the inactivity timer 118 with data specifying an amount of time for the reception of cellular radio 118 to remain inactive. For example, the power manager 120 may write data to a register associated with the inactivity timer 118, and the data may indicate a period of inactivity for receiving data from the cellular network. In accordance with further example implementations, the power manager 120 may program the inactivity timer 118 by programming a register of the cellular radio 118 to select a particular operational mode for the radio 114, which corresponds to a particular level of activity/inactivity level for radio reception.

More specifically, in accordance with example implementations, the power manager 120 may write data to a register associated with the cellular radio 114 to select a particular reception mode for the cellular radio 110 based on the determined consumption time. In accordance with example implementations, the cellular radio 114 may have multiple reception modes, which are associated with different, predefined periods of reception inactivity for the radio 114 and which are associated with different corresponding power consumption states for the radio 114. Thus, many implementations are contemplated, which are within the scope of the appended claims.

Figure 3A:
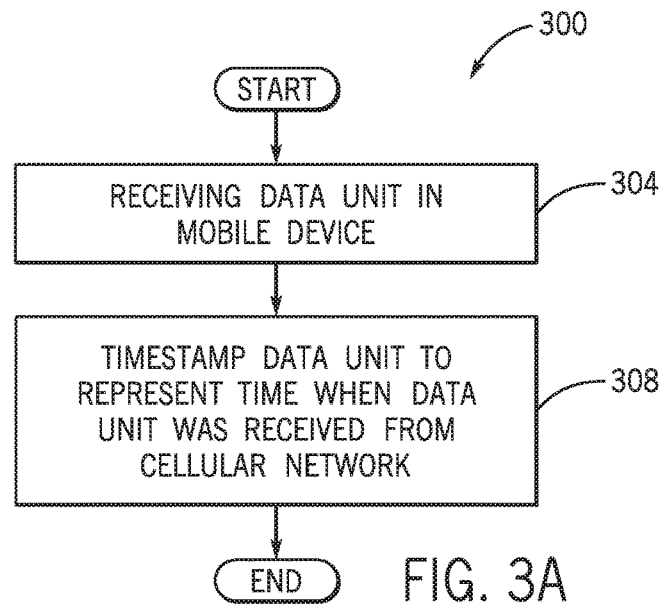
FIG. 3A is a flow diagram depicting a technique used by a mobile device to label a data unit received from a cellular network according to an example implementation.

To summarize, referring to FIG. 3A in conjunction with FIG. 1, in accordance with example implementations, the mobile device 100 performs a technique 300 for purposes of labeling data content received from the cellular network. The technique 300 includes receiving (block 304) a data unit in the mobile device and timestamping (block 308) the data unit to represent a time when the data unit was received from the cellular network.

Figure 3B:
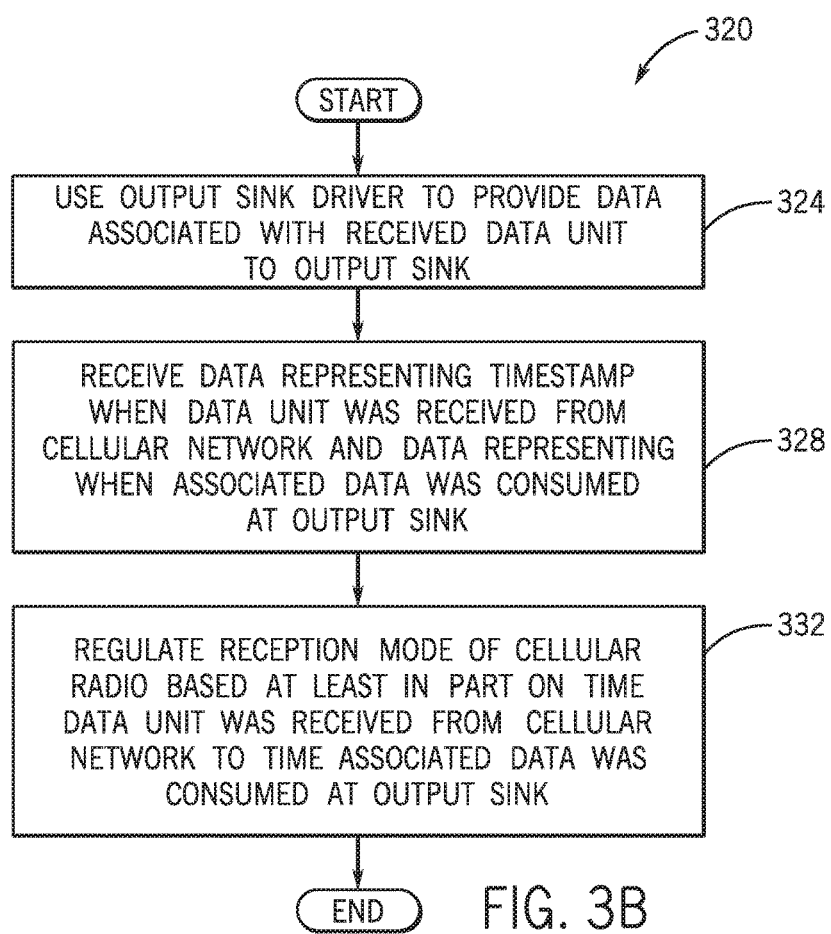
FIG. 3B is a flow diagram depicting a technique to regulate a reception mode of a cellular radio according to an example implementation.

Referring to FIG. 3B in conjunction with FIG. 1, in accordance with example implementations, the mobile device 100 performs a technique 320 for purposes of using the timestamped data to regulate the power consumption state of its cellular radio 114. Pursuant to the technique 320, the mobile device 100 uses an output sink driver (an audio decoder driver, a video decoder driver, a network interface driver, and so forth) to provide a data associated with the received data unit to the output sink 144, pursuant to block 324. The mobile device 100 receives (block 328) data representing a timestamp when the associated data was received from the cellular network and data representing a time when the data unit was consumed at the output sink 144. Pursuant to block 332 of the technique 320, the mobile device 100 selects a reception mode of the cellular radio based at least in part on the time between the time that the data was received from the cellular network and the time that the associated data was consumed at the output sink 144.

In accordance with example implementations, the cellular radio 114 may be an LTE radio. In this manner, in accordance with example implementations, the cellular radio 114 operates with mobile communications networks according to the LTE standards, as provided by the Third Generation Partnership Project (3GPP). The LTE standards are also referred to as the Evolved Universal Terrestrial Radio Access (E-UTRA) standards. Pursuant to the LTE standards, the cellular radio 114 may have several reception modes, which are associated with different periods of inactivities and which are correspondingly associated with different power consumptions. Some of these nodes are discontinuous reception (DRX) modes, (i.e., nodes in which the cellular radio is at least partially powered down for periods and does not receive data from the cellular network.

In this manner, the cellular radio 114 may have a short DRX mode that is associated with a relatively long latency and a relatively low power consumption; and a long DRX mode, which has a relatively smaller latency and a relatively larger power consumption. The cellular radio 114 may also have, in accordance with example implementations, a sleep mode, such as an RRC_IDLE mode, in which the radio 114 has the longest latency and least power consumption. The short DRX, long DRX and RRC_IDLE modes are power conservation modes of the cellular radio 114, as compared to the continuous reception mode, an RRC_CONNECTED mode, for example, in which the cellular radio 114 is fully powered up for purposes of being available to continuously receive data from the cellular network.

In accordance with example implementations, based on the determined consumption time, the power manager 120 selects the short DRX, the long DRX, RRC_IDLE or the RRC_CONNECTED mode for the cellular radio 114.

It is noted that regardless of the particular reception mode in which the particular cellular radio 114 is placed, in accordance with example implementations, the cellular radio 114 may be constructed to immediately power up for purposes of transmitting data to the cellular network.

Figure 4:
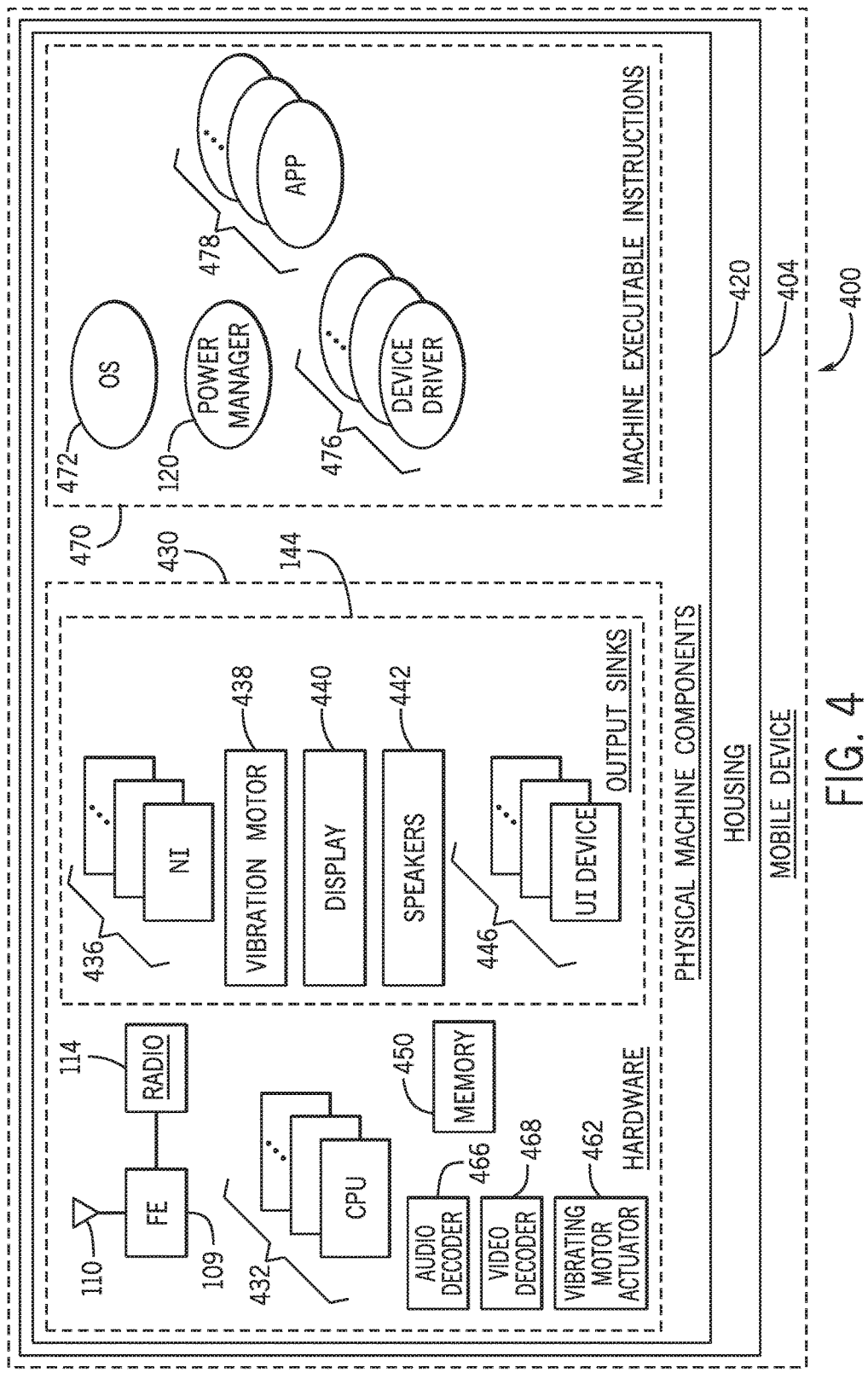
FIG. 4 is a schematic diagram of a mobile device according to an example implementation.

FIG. 4 depicts a mobile device 400 in accordance with example implementations. The mobile device 400 is a physical machine that is made up of actual hardware 430 and machine executable instructions 470, or "software." As depicted in FIG. 4, physical machine components 420 (the hardware 430 and the machine executable instructions 470) of the mobile device 400 may be contained in a portable (hand-held, for example) housing 404, in accordance with example implementations.)

In accordance with example implementations, the hardware 430 includes one or multiple central processing units (CPUs) 432, the cellular radio 114, the front end circuitry 109 and the antenna 110. Moreover, the hardware 430 includes various output sinks 144, such as one or multiple speakers 442, a display 440, a vibration motor 438, and one or more network interfaces 436. Moreover, the output sinks 144 may include one or multiple other user interface devices 446.

The hardware 430, in accordance with example implementations, may also include a memory 450. In general, the memory 450 is a non-transitory storage medium that may be formed from one or multiple memory devices. In this regard, the memory 450 may include semiconductor storage devices, phase change memory devices, memristors, optical storage, magnetic storage, and so forth, depending on the particular implementation. The memory 450, in general, may store program instructions, audio data, video data, data structures, data being processed by the CPU(s) 432, and so forth.

The hardware 430 of the mobile device 400 may include various other hardware components, such as (as examples) other radios (Bluetooth radio, WiFi radio, Global Positioning Satellite (GPS) radios, and so forth), an audio decoder 466, a vibrating motor actuator 462, a video decoder 468, and so forth.

As also shown in FIG. 4, the machine executable instructions 470 may include instructions that when executed by the CPU(s) 432 form one or more software components, such as an operating system 472, the power manager 120, one or multiple device drivers 476 (audio drivers, video drivers, network interface drivers, and so forth) and one or multiple applications 478. In further example implementations, the power manager 120 may be formed from dedicated hardwired circuitry; dedicated processor-based circuitry that executes machine executable instructions; logic devices; and so forth.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A method comprising:
    determining a consumption time for a first content received in a mobile device from a cellular network, the consumption time representing a time at which the first content is received in the mobile device to a time at which a second content associated with the first content is consumed at an output sink of the mobile device, wherein the second content includes the first content processed by the mobile device;
    determining a content flow rate associated with the first content and the second content through the mobile device, and based on the consumption time and a size of the first content; and
    regulating a power consumption state of a radio of the mobile device based at least in part on the content flow rate at which the first content flows through the mobile device.

2. The method of claim 1, wherein determining the consumption time comprises determining a time at which the first content is received in a network interface of the mobile device to a time at which the mobile device produces an audio or visual output based on the first content.

3. The method of claim 1, wherein determining the consumption time comprises determining a time from when the first content is received in a network interface of the mobile device to a time at which the first content is transmitted by the mobile device to a device tethered to the mobile device.

4. The method of claim 1, wherein determining the consumption time comprises performing information flow tracking of the first content through the mobile device, comprising attaching a time stamp to the first content in response to the first content being received in the mobile device and determining the time consumption based at least in part on the time stamp and a time at which the first content is provided to the output sink.

5. The method of claim 1, wherein regulating the power consumption state comprises selecting a power consumption mode for the radio based at least in part on the consumption time.

6. The method of claim 5, wherein regulating the power consumption state further comprises selecting the power consumption mode from a plurality of candidate power consumption modes, wherein the plurality of candidate power consumption modes comprises a plurality of idle modes and a continuous mode, wherein the radio is powered down for periods of inactivity in response to the radio being placed in one of the idle modes and the radio is continuously power up in response to the radio being placed in the continuous mode.

7. The method of claim 5, wherein regulating the power consumption state further comprises selecting the power consumption mode from a relatively short discontinuous reception mode, a relatively long discontinuous reception mode and a continuous discontinuous reception mode based at least in part on the consumption time.

8. An apparatus comprising:
    a radio having a plurality of selectable reception modes associated with a plurality of power consumptions;
    an output device;
    a memory coupled to the radio to receive a first content communicated over a cellular network, wherein a second content associated with the first content is communicated from the memory to the output device; and
    a processor to:
        track a flow associated with the first content and the second content, wherein the second content includes the first content processed by the processor;
        determine a content flow rate associated with the first content and the second content through the apparatus based on a consumption time between a receipt of the first content at the radio and a communication of the second content to the output device, and a size of the first content; and
        regulate selection of a reception mode of the selectable reception modes for radio based at least in part on the content flow rate.

9. The apparatus of claim 8, wherein the radio, the output device, memory and the processor are contained within a handheld housing.

10. The apparatus of claim 8, further comprising a labeler to assign a label to the first content.

11. The apparatus of claim 8, further comprising a timestamp source and a device driver associated with the output device and comprising a processor, the device driver to:
- communicate the first content to the output device;
- determine a time associated with communicating the first content to the output device based on an indication of time provided by the timestamp source; and
- communicate the time to the processor.

12. An article comprising a computer readable non-transitory storage medium to store instructions that when executed by a computer cause the computer to:
- determine a first time that a data unit was received into a mobile device from a cellular network;
- determine a second time for a second data associated with the data unit to be consumed at an output sink of the mobile device, wherein the second data includes the data unit processed by the mobile device;
- determine a data flow rate associated with the data unit and the second data through the article based on the first time that the data unit was received into the mobile device, the second time for a data associated with the data unit to be consumed at an output sink of the mobile device, and a size of the data associated with the data unit; and
- regulate an inactivity timer associated with the mobile device based at least in part on a consumption time based on a difference between the first time and the second time and on the size of the data unit.

13. The article of claim 12, wherein the output sink comprises a display, a speaker, a vibration unit and a non-cellular network interface.

14. The article of claim 12, wherein the mobile device comprises a timestamp source, and the computer readable non-transitory storage medium storing instructions that when executed by the computer cause the computer to:
- determine a label representing a time at which the data unit is received into the mobile device;
- append the label to the data unit; and
- determine the time for the data to be consumed at the output sink based at least in part on the label appended to the data unit.

15. The article of claim 12, the computer readable non-transitory storage medium storing instructions that when executed by the computer cause the computer to regulate a reception mode of the mobile device based at least in part on a difference between the first and second times.

* * * * *